(12) United States Patent
Walther et al.

(10) Patent No.: US 8,791,185 B2
(45) Date of Patent: Jul. 29, 2014

(54) 2-ETHYLHEXYL METHYL TEREPHTHALATE AS PLASTICIZER IN ADHESIVES AND SEALANTS

(75) Inventors: Burkhard Walther, Garching (DE); Tobias Austermann, Münster (DE); Boris Breitscheidel, Limburgerhof (DE); Jochen Wagner, Ruppertsweiler (DE)

(73) Assignee: BASF SE, Ludwigshafen (DE)

( * ) Notice: Subject to any disclaimer, the term of this patent is extended or adjusted under 35 U.S.C. 154(b) by 8 days.

(21) Appl. No.: 13/164,175

(22) Filed: Jun. 20, 2011

(65) Prior Publication Data

US 2011/0308730 A1 Dec. 22, 2011

Related U.S. Application Data

(60) Provisional application No. 61/356,671, filed on Jun. 21, 2010.

(51) Int. Cl.
  *C08K 5/12* (2006.01)
  *C08K 5/10* (2006.01)
  *B32B 7/12* (2006.01)

(52) U.S. Cl.
  USPC ............ 524/287; 524/296; 524/297; 156/327

(58) Field of Classification Search
  CPC ......... C08K 5/12; C08K 5/0016; C09J 11/06; B32B 27/22
  USPC ............................ 524/287, 296, 297; 156/327
  See application file for complete search history.

(56) References Cited

U.S. PATENT DOCUMENTS

| | | | |
|---|---|---|---|
| 3,431,239 A | 3/1969 | Morris et al. | |
| 3,632,557 A | 1/1972 | Brode et al. | |
| 3,971,751 A | 7/1976 | Isayama et al. | |
| 4,618,653 A | 10/1986 | Kawakubo et al. | |
| 4,857,623 A | 8/1989 | Emmerling et al. | |
| 5,364,955 A | 11/1994 | Zwiener et al. | |
| 2004/0260037 A1 | 12/2004 | Schindler et al. | |
| 2005/0119421 A1 | 6/2005 | Schindler et al. | |
| 2007/0167598 A1 | 7/2007 | Stanjek | |
| 2008/0057317 A1* | 3/2008 | Kettner et al. | 428/423.1 |

FOREIGN PATENT DOCUMENTS

| | | | |
|---|---|---|---|
| DE | 2 307 794 | 8/1973 | |
| DE | 100 32 580 | 1/2002 | |
| EP | 0 184 829 | 6/1986 | |
| EP | 0 265 929 | 5/1988 | |
| EP | 0 319 896 | 6/1989 | |
| EP | 0 918 062 | 5/1999 | |
| EP | 0 931 800 | 7/1999 | |
| EP | 1 093 482 | 4/2001 | |
| EP | 1 245 601 | 10/2002 | |
| EP | 1 285 946 | 2/2003 | |
| EP | 1 498 433 | 1/2005 | |
| EP | 1 685 171 | 8/2006 | |
| WO | WO 99/32427 | 7/1999 | |
| WO | WO 99/48942 | 9/1999 | |
| WO | WO 01/16201 | 3/2001 | |
| WO | WO 2004/060953 | 7/2004 | |
| WO | WO 2005/042601 | 5/2005 | |
| WO | WO 2006/088839 | 8/2006 | |
| WO | WO 2008/027435 | 3/2008 | |
| WO | WO 2008/027463 | 3/2008 | |
| WO | WO 2008/061651 | 5/2008 | |
| WO | WO 2010/028870 | 3/2010 | |
| WO | WO 2010/104534 | 9/2010 | |
| WO | WO 2010104534 A1 * | 9/2010 | ............ C08L 83/04 |
| WO | WO 2011/054782 | 5/2011 | |

OTHER PUBLICATIONS

"Sales Specification No. 23117-2", Eastman Chemical Company, Jan. 22, 2007 (1 pg.).
"Safety Data Sheet", Eastman Chem. Co., MSDS, Mar. 24, 2011, pp. 1-11.
"Organic Syntheses Without Solvent: BASE-Catalysed Ester interchange", Tetrahedron letters, vol. 29, No. 36, pp. 4567-4568.
International Search Report, PCT/EP2011/060187, Filed Jun. 20, 2011, mailed Dec. 7, 2011.

* cited by examiner

*Primary Examiner* — Michael Pepitone
(74) *Attorney, Agent, or Firm* — Drinker Biddle & Reath LLP

(57) ABSTRACT

The invention provides an adhesive or sealant comprising (A) at least one compound selected from the group consisting of polyurethanes, polyureas, polyacrylates, polysulphides, silylated polyurethanes, silylated polyureas, silylated polyethers, silylated polysulphides and silyl-terminated acrylates, and (B) at least 0.32% by weight of 2-ethylhexyl methyl terephthalate, based on the overall adhesive or sealant. A process is disclosed for preparing the adhesive or sealant, and also disclosed is the use thereof for producing material bonds between parts to be joined.

15 Claims, No Drawings

2-ETHYLHEXYL METHYL TEREPHTHALATE AS PLASTICIZER IN ADHESIVES AND SEALANTS

CROSS-REFERENCE TO RELATED APPLICATIONS

The present specification includes by reference the provision U.S. application 61/356,671, filed Jun. 21, 2010.

BACKGROUND OF THE INVENTION

The present invention relates to adhesives and sealants based on specific binders comprising at least 0.32% by weight of 2-ethylhexyl methyl terephthalate, based on the overall adhesive or sealant. In addition, the invention discloses a process for preparing them, and their use.

Adhesives and sealants based on polyurethanes, polyureas, polyacrylates, polysulphides, silylated polyurethanes, silylated polyureas, silylated polyethers, silylated polysulphides and silyl-terminated acrylates have a very broad application spectrum and are used, in formulations adapted to the particular end use, in—for example—construction and civil engineering, in the aircraft or automotive industry, and in watercraft construction. A key component of such a formulation is generally plasticizers, which may account for a fraction of more than 40% of the total formulation. Plasticizers, according to DIN 55945, are inert organic solids and liquids with a low vapour pressure. Through their solvency and swelling capacity, they reduce the hardness of the polymer, compatibilize the filler/polymer mixture, and raise the low-temperature elasticity. Plasticizers in adhesives and sealants also serve in particular to increase the expandability of the film that is produced.

Adhesives and sealants are intended to be very easy to process, but also to be sufficiently sag-resistant; in other words, the plasticizer used is intended as far as possible to lower the force required for processing, on ejection of the sealant from the cartridge, for example, but at the same time not to cause sustained impairment of the sag resistance. This property is determined through the flow point. Moreover, adhesives and sealants are intended, after crosslinking, to obtain an optimum balance between elongation and tensile strength, and, after having been introduced into the joint or the substrate, should be optimally amenable to smoothing.

Given that the stated compounds and methods have still not ultimately solved the fundamental problem of optimizing the properties of adhesives and sealants based on polyurethanes, polyureas, polyacrylates, polysulphides, silylated polyurethanes, silylated polyureas, silylated polyethers, silylated polysulphides and silyl-terminated acrylates, the object on which the present invention is based was that of developing other formulations, which are easy to process, based on these polymers. In such formulations, the adhesives and sealants should have a low flow point and also good mechanical properties, and in addition ought to result in optimal smoothness.

BRIEF SUMMARY OF THE INVENTION

The object has been achieved in accordance with the invention by means of adhesives or sealants comprising (A) at least one compound selected from the group consisting of polyurethanes, polyureas, polyacrylates, polysulphides, silylated polyurethanes, silylated polyureas, silylated polyethers, silylated polysulphides and silyl-terminated acrylates, and (B) at least 0.32% by weight of 2-ethylhexyl methyl terephthalate, based on the overall adhesive or sealant.

It has been found, surprisingly, that the adhesives and sealants of the invention, in comparison to the prior art, have improved flow properties at tensile properties which remain constant and are easy to smooth.

DETAILED DESCRIPTION OF THE PREFERRED EMBODIMENTS

The term "adhesives and sealants" refers to any composition which can be used to produce a connection between two or more articles or bodies, or which is suitable for filling openings, seams or spaces in, on or between one or more articles or bodies (for example grooves, holes, cracks, joints, spaces between adjacent or overlapping articles, pores and seams). Thus sealants are used, for example, for filling spaces caused by adjacent or overlapping structures, such as, for instance, window joints and sanitary joints or else joints in automotive, aircraft or watercraft construction, and also construction joints, civil engineering joints and flooring joints. In specific embodiments the sealants can also be used to make surfaces smooth or, in the form of a sealing compound, to prevent the ingress or egress of moisture, chemicals or gases through the aforementioned openings, joints or cavities, the aforementioned properties not constituting necessary features of the stated adhesives and sealants. Adhesives and sealants cure during or after application, by chemical or physical processes in one or more components of the composition.

In specific embodiments of the present invention the adhesives and sealants are self-curing. This means that, following application, the compositions cure, without the need for external factors, such as heating or irradiation, for the curing process. In other embodiments they may be emulsions of one or more polymers in water or other solvents (polyacrylates for example) which cure physically in the course of drying. Furthermore, however, it is also possible for the prepolymers used to undergo polymerization as a result of the ambient moisture, as is the case, for example, for the isocyanate-terminated polyurethanes or isocyanate-terminated polyurea prepolymers. The adhesives and sealants of the invention may also be two-component or multi-component systems which are brought into contact with one another and/or mixed with one another shortly before, or during, application, with the reaction thus triggered leading to the curing of the system (examples being two-component polyurethane or polyurea systems).

The adhesives or sealants of the invention may therefore preferably be a one-component system or a two-component system.

The polymers used as component A) are generally products obtained by the polymerization of at least one type of monomer. Where the polymers contain two or more types of monomer, these monomers may be arranged in the polymer in any form—that is, they may be present either randomly distributed or in blocks. It is essential to the invention that component (A) used is at least one polymer from the group consisting of polyurethanes, polyureas, polyacrylates, polysulphides, silylated polyurethanes, silylated polyureas, silylated polyethers, silylated polysulphides and silyl-terminated acrylates.

The polyurethanes and polyureas are synthesized from at least one polyol and/or polyamine component and also from a polyisocyanate component, and may optionally comprise chain extenders.

The mode of preparation of the polyurethane or polyurea prepolymers is not critical to the present invention. It may therefore be a one-stage operation, in which the polyols and/ or polyamines, polyisocyanates and chain extenders are reacted with one another simultaneously, which may take place, for example, in a batch reaction, or else it may be a two-stage operation, in which, for example, the first product formed is a prepolymer, which is subsequently reacted with chain extenders.

The polyurethanes or polyureas may also comprise further structural units, which more particularly may be allophanates, biuret, uretdione or cyanurates. The aforementioned groups, however, are only examples, and the polyurethanes and polyureas of the invention may also comprise further structural units. The degree of branching as well is not critical to the present invention, and so both linear and highly branched polymers can be used.

In one preferred embodiment of the invention the molar ratio of the isocyanate component present in the polymer to the sum of the polyol and/or polyamine component is 0.01 to 50, preferably 0.5 to 3.0.

The isocyanate component is preferably an aliphatic, cycloaliphatic, araliphatic and/or aromatic compound, preferably a diisocyanate or triisocyanate, and may also comprise mixtures of these compounds. It is regarded here as being preferred for it to be hexa-methylene 1,6-diisocyanate (HDI), HDI uretdione, HDI isocyanurate, HDI biuret, HDI allophanate, 1-isocyanato-3,3,5-trimethyl-5-isocyanatomethylcyclohexane (IPDI), 2,4- and/or 2,6-tolylene diisocyanate (TDI) and/or 4,4'-, 2,4'- and/or 2,2'-diphenylmethane diisocyanate (MDI), polymeric MDI, carbodiimide-modified 4,4'-MDI, m-xylene diisocyanate (MXDI), m- or p-tetramethylxylene diisocyanate (m-TMXDI, p-TMXDI), 4,4'-dicyclohexylmethane diisocyanate (H12MDI), naphthalene-1,5-diisocyanate, cyclohexane 1,4-diisocyanate, hydrogenated xylylene diisocyanate (H6XDI), 1-methyl-2,4-diisocyanatocyclohexane, tetramethoxybutane 1,4-diisocyanate, butane 1,4-diisocyanate, 1,6-diisocyanato-2,2,4-trimethylhexane, 1,6-diisocyanato-2,4,4-trimethylhexane, 1-isocyanato-1-methyl-4(3)-isocyanatomethylcyclohexane (IMCI) and 1,12-dodecane diisocyanate (C12DI). It may also be 4-dichlorophenyl diisocyanate, dicyclohexylmethane 4,4'-diisocyanate, m-phenylene diisocyanate, p-phenylene diisocyanate, 4-chloro-1,3-phenylene diisocyanate, 1,6-hexamethylene diisocyanate, 1,10-decamethylene diisocyanate, lysine alkyl ester diisocyanate, 3,3'-dimethyl-4,4'-diphenylmethane diisocyanate, xylylene diisocyanate, tetramethylxylylene diisocyanate, 1,5-tetrahydronaphthalene diisocyanate, triisocyanatotoluene, methylene-bis(cyclohexyl) 2,4'-diisocyanate and 4-methylcyclohexane 1,3-diisocyanate. Suitable more particularly are polyisocyanates having two or three isocyanate groups per molecule. Alternatively this component may comprise mixtures of polyisocyanates, with the average NCO functionality of the isocyanate component in the mixture being able in particular to be 2.1 to 2.3, 2.2 to 2.4, 2.6 to 2.8 or 2.8 to 3.0. Derivatized polyisocyanates may likewise be used, examples being sulphonated isocyanates, blocked isocyanates, isocyanurates and biuret isocyanates.

The polyol and/or polyamine component preferably comprises polyetherester polyol, fatty acid ester polyols, polyether polyols, polyester polyols, polybutadiene polyols and polycarbonate polyols, and may also comprise mixtures of these compounds. The polyols and/or polyamines contain preferably between two and 10, more preferably between two and three hydroxyl groups and/or amino groups, and possess a weight-average molecular weight of between 32 and 30 000, more preferably between 90 and 18 000 g/mol. Suitable polyols are preferably the polyhydroxy compounds that at room temperature are liquids, glasslike solids/amorphous compounds or crystalline compounds. Typical examples might include difunctional polypropylene glycols. It is also possible for preferably hydroxyl-containing random copolymers and/or block copolymers of ethylene oxide and propylene oxide to be used. Suitable polyether polyols are the polyethers known per se in polyurethane chemistry, such as the polyols prepared, using starter molecules, by means of KOH catalysis or DMC catalysis, from styrene oxide, ethylene oxide, propylene oxide, butylene oxide, tetrahydrofuran or epichlorohydrin.

Specific suitability is also possessed more particularly by poly(oxytetramethylene) glycol (polyTHF), 1,2-polybutylene glycol, or mixtures thereof. Particular suitability is possessed by polypropylene oxide, polyethylene oxide and butylene oxide and mixtures thereof. Another type of copolymer which can be used as a polyol component and which terminally contains hydroxyl groups is in accordance with the following general formula (and can be prepared, for example, by means of "controlled" high-speed anionic polymerization according to Macromolecules 2004, 37, 4038-4043):

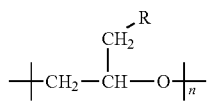

in which R is alike or different and is represented preferably by OMe, OiPr, Cl or Br.

Additionally suitable as a polyol component are, more particularly, the polyester diols and polyester polyols which at 25° C. are liquid, glasslike-amorphous or crystalline compounds and which are preparable by condensation of dicarboxylic or tricarboxylic acids, such as adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid and/or dimer fatty acid, with low molecular mass diols, triols or polyols, such as ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, pentaerythritol and/or trimethylolpropane.

A further suitable group of polyols are the polyesters based, for example, on caprolactone, which are also referred to as "polycaprolactones". Other polyols which can be used are polycarbonate polyols, dimer fatty alcohols and dimerdiols, and also polyols based on vegetable oils and their derivatives, such as castor oil and its derivatives or epoxidized soybean oil. Also suitable are polycarbonates containing hydroxyl groups, which are obtainable by reacting derivatives of carbonic acid, e.g. diphenyl carbonate, dimethyl carbonate or phosgene, with diols. Particular suitability is possessed for example by ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butanetriol, trimethylolpropane, pentaerythritol, quinitol, mannitol, sorbitol, methylglycoside and 1,3,4,6-dianhydrohexitols. The hydroxy-functional polybutadienes as well, which are purchasable under trade names including that of "Poly-bd®", can be used as a polyol component, as can their hydrogenated analogues. Additionally suitable are hydroxy-functional polysulphides, which are sold under the trade name "Thiokol® NPS-282", and also hydroxy-functional polysiloxanes.

Particular suitability as a polyamine component which can be used in accordance with the invention is possessed by hydrazine, hydrazine hydrate and substituted hydrazines, such as N-methylhydrazine, N,N'-dimethylhydrazine, acid hydrazides of adipic acid, methyladipic acid, sebacic acid, hydracrylic acid, terephthalic acid, isophthalic acid, semicarbazidoalkylene hydrazides, such as 13-semicarbazidopropionyl hydrazide, semicarbazidoalkylene-carbazine esters, such as, for example, 2-semicarbazidoethylcarbazine ester and/or aminosemicarbazide compounds, such as 13-aminoethyl semicarbazidocarbonate. Also suitable for preparing the polyurethanes and polyureas are polyamines based on polyesters, polyolefins, polyacetals, polythioethers, polyethercarbonates, polyethylene terephthalates, polyesteramides, polycaprolactams, polycarbonates, polycaprolactones and polyacrylates which contain at least two amine groups. Polyamines, such as those sold under the trade name of Jeffamine® (which are polyether polyamines), are also suitable.

As polyol component and/or polyamine component, suitability is also possessed by the species which are known as chain extenders and which, in the preparation of polyurethanes and polyureas, react with excess isocyanate groups; they normally have a molecular weight (Mn) of below 400 and are frequently present in the form of polyols, aminopolyols or aliphatic, cycloaliphatic or araliphatic polyamines.

Examples of suitable chain extenders are as follows:
alkanediols, such as ethanediol, 1,2- and 1,3-propanediol, 1,4- and 2,3-butanediol, 1,5-pentanediol, 1,3-dimethylpropanediol, 1,6-hexanediol, neopentyl glycol, cyclohexanedimethanol, 2-methyl-1,3-propanediol, hexylene glycol, 2,5-dimethyl-2,5-hexanediol, ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, dipropylene glycol, diethylene glycol, 1,2-, 1,3- or 1,4-cyclohexanediol, 1,2-, 1,3- or 1,4-cyclohexanedimethanol, trimethylpentanediol, ethylbutylpropanediol, diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene and 1,3-bis(2'-hydroxypropyl)benzene, and δ-hydroxybutyl-ε-hydroxy-caproic esters, ω-hydroxyhexyl-γ-hydroxy-butyric esters, adipic acid-(β-hydroxyethyl) ester or terephthalic acid bis(β-hydroxyethyl)ester, and aliphatic diamines, aromatic diamines and alicyclic diamines, more particularly methylenediamine, ethylenediamine, 1,2- and 1,3-diaminopropane, 1,4-diaminobutane, cadaverine (1,5-diaminopentane), 1,6-hexamethylenediamine, isophoronediamine, piperazine, 1,4-cyclohexyldimethylamine, 4,4'-diaminodicyclohexylmethane, aminoethylethanolamine, 2,2,4-trimethylhexamethylenediamine, 2,4,4-trimethylhexamethylenediamine, octamethylenediamine, m- or p-phenylenediamine, 1,3- or 1,4-xylylenediamine, hydrogenated xylylenediamine, bis(4-aminocyclohexyl)methane, 4,4'-methylenebis(ortho-chloroaniline), di(methylthio)toluenediamine, diethyltoluenediamine, N,N'-dibutylaminodiphenylmethane, bis(4-amino-3-methylcyclohexyl)methane, isomer mixtures of 2,2,4- and 2,4,4-trimethyl-hexamethylenediamine, 2-methylpentamethylenediamine, diethylenetriamine, and 4,4-diaminodicyclohexylmethane, and also ethanolamine, hydrazineethanol, 2-[(2-aminoethyl)amino]ethanol.

Lastly it should be mentioned that the polyol component and/or polyamine component may contain double bonds, which may result, for example, from long-chain aliphatic carboxylic acids or fatty alcohols. Functionalization with olefinic double bonds is also possible, for example, through the incorporation of vinylic and/or allylic groups, which optionally are alkyl-, aryl- and/or aralkyl-substituted, and also originate unsaturated acids such as maleic anhydride, acrylic acid or methacrylic acid and their respective esters.

For the purposes of the invention it is preferred for the polyol component and/or polyamine component to be polypropylene diol, polypropylene triol, polypropylene polyol, polyethylene diol, polyethylene triol, polyethylene polyol, polypropylenediamine, polypropylenetriamine, polypropylenepolyamine, polyTHF-diamine, polybutadiene diol, polyester diol, polyester triol, polyester polyol, polyesterether diol, polyesterether triol, polyesterether polyol, more preferably polypropylene diol, polypropylene triol, polyTHF diol, polyhexanediol carbamate diol, polycaprolactamdiol and polycaprolactamtriol. It is also possible for these components to be mixtures of the stated compounds.

In one particularly preferred embodiment the polyurethanes or polyureas contain polyols having a molecular weight of between 1000 and 10 000, more particularly 2000 to 6000 and very preferably 3000 to 5000 g/mol. These polyols are, with particular preference, polyTHF diol, polypropylene glycol, and also random copolymers and/or block copolymers of ethylene oxide and propylene oxide. More particularly they may be polyether polyols which in one preferred embodiment have been prepared by DMC catalysis and in one particularly preferred embodiment have been prepared by KOH catalysis. In one preferred embodiment use is made as chain extenders of diols having a molecular weight of 60 to 500, more particularly 60 to 180, the dioligomers of glycols being particularly preferred. With regard to the inventive properties of the adhesives and sealants it is particularly advantageous, furthermore, if the polyurethanes or polyureas contain 2,4- and/or 2,6-tolylene diisocyanate (TDI) and/or 4,4'-, 2,4'- and/or 2,2'-diphenylmethane diisocyanate (MDI) and/or 1-isocyanato-3,3,5-trimethyl-5-isocyanatomethylcyclohexane (IPDI), more particularly isomer mixtures of TDI, where a 2,4-isomer fraction of more than 40% is particularly preferred.

The polyurethanes or polyureas of the present invention may also comprise crosslinker components, chain stopper components and other reactive components. Some crosslinkers have already been listed among the chain extenders having at least three NCO-reactive hydrogens. The compounds in question may more particularly be glycerol, tetra(2-hydroxypropyl)ethylenediamines, pentaerythritol, trimethylolpropene, sorbitol, sucrose, triethanolamine and polymers having at least three reactive hydrogens (e.g. polyetheramines having at least three amine groups, polymeric triols, etc.). Suitable chain stoppers are, in particular, compounds having reactive hydrogens, such as monools, monoamines, monothiols and monocarboxylic acids. One specific embodiment uses monools, where $C_1$ to $C_{12}$ alcohols (especially methanol to dodecyl alcohol), higher alcohols, polymers such as, for instance, polyethers and polyesters having an OH group and structural units such as glycerol or sucrose, in which all bar one OH group have been reacted, with no further reactive hydrogen having been introduced in the course of the reaction.

In one particularly UV-stable variant, it is preferred as polyol component to use polyesters having at least two OH groups, polycarbonates having at least two OH groups, polycarbonate esters having at least two OH groups, polyTHF, polypropylene glycol, random copolymers and/or block copolymers of ethylene oxide and propylene oxide.

Adhesives and sealants comprising polyurethanes may further comprise stabilizing additives, to protect, for example, from UV radiation, and oxidation; additives of the HALS type are used more particularly. Mention may be made, by way of example, of 4-amino-2,2,6,6-tetramethylpiperidine.

For the polyurethanes and polyureas it is possible as latent curing agents to use oxazolidines, more particularly oxazolidines formed from diethanolamine and isobutylaldehyde or pivalaldehyde and/or aldemines formed from isophoronediamine, e.g. Incozol HP and imines, e.g. Vestamin A139, low molecular mass aliphatic diamines, e.g. hexanediamine, and/or polyether polyamines such as, for example, Jeffamine® and isobutyraldehyde or pivalaldehyde, and/or a polyamine such as hexamethylenediamine, for example, or a Jeffamin® blocked with a hydroxypivalaldehyde ester.

In one preferred embodiment the adhesive or sealant of the invention comprises polyurethanes or polyureas which contain free isocyanate groups. The compounds in question here are more particularly isocyanate-terminated prepolymers. The isocyanate groups are able to react with water (including moisture from the atmosphere), forming amine groups which react with the isocyanate groups of the other polyurethane or polyurea molecules, and form urea linkages, thereby curing the adhesive or sealant.

In another embodiment, polyurea or polyurethane adhesives and sealants are configured as a two-component system. The first component may comprise a polyisocyanate and/or NCO prepolymer and the second component may comprise a polyol, polyamine and/or chain extender. After the two components have been mixed, these two constituents react with one another, thereby curing the adhesive or sealant.

In a further embodiment in accordance with the invention, polyurethane prepolymers and polyurea prepolymers are reacted with at least one suitable functionalized polymerizable compound containing double bond, such as hydroxyethyl methacrylate, hydroxyethyl acrylate, hydroxypropyl methacrylate, hydroxypropyl acrylate, 4-hydroxybutyl vinyl ether and isoprenol, for example.

The silylated polyurethanes and silylated polyureas are constructed from at least one polyol or polyamine component, from at least one polyisocyanate component and from at least one silylating component.

As preferred polyol or polyamine component, and polyisocyanate component, all of the compounds specified for the above-described preparation of the polyurethanes and polyureas are suitable. As far as the silylating component present is concerned, suitability is possessed by
1. primary and/or secondary aminosilanes; α or γ position
   e.g. $H_2N-CH_2-Si(OR^2)_3$
   $H_2N-(CH_2)_3-Si(OR^2)_3$
   $R'NH-(CH_2)_3-Si(OR^2)_3$
   $R'NH-CH_2-CHMe-CH_2-Si(OR^2)_3$
   where $OR^2$ independently of one another is represented by an alkoxy group, with $R^2$ being an alkyl group having one to 5 carbon atoms, e.g. methyl, ethyl, isopropyl, n-propyl, n-butyl, isobutyl, sec-butyl, and/or $OR^2$ is a phenoxy group, a naphthyloxy group, a phenoxy group which is substituted in the ortho-, meta- and/or para-position, with a $C_1$-$C_{20}$ alkyl, alkylaryl, alkoxy, phenyl, substituted phenyl, thioalkyl, nitro, halogen, nitrile, carboxyalkyl, carboxyamide, —$NH_2$ and/or NHR group, in which R is a linear, branched or cyclic $C_1$-$C_{20}$ alkyl group, e.g. methyl, ethyl, propyl (m, iso), butyl (m, iso, sec) or cyclohexyl or phenyl, with R' being a linear, branched or cyclic $C_1$-$C_{20}$ alkyl group, e.g. methyl, ethyl, propyl (m, iso), butyl (m, iso, sec) or cyclohexyl or phenyl,
2. isocyanatosilanes; α or γ position
3. products obtained by Michael addition of primary aminosilanes in α- and γ-position and ring closure to form the hydantoin, e.g. U.S. Pat. No. 5,364,955.

With regard to the silylating component present, reference is made to patent applications WO 2006/088839 A2 and WO 2008/061651 A1, and also to patent EP 1 685 171 B1, the content of which is hereby adopted into the present specification.

The silylating components which are present in the silylated polyurethane or in the silylated polyurea and which are preferred for the purposes of the present invention are more particularly silanes of the general formula:

where Y is represented by —NCO, —NHR, —$NH_2$ or —SH,
R is represented by an alkyl group or aryl group having one to 20 carbon atoms, e.g. methyl, ethyl, isopropyl, n-propyl, butyl group (n-, iso-, sec-), cyclohexyl, phenyl and naphthyl,
$R^1$ is represented by a divalent hydrocarbon unit having one to 10 carbon atoms, e.g. ethylene, methylethylene,
Me is represented by methyl,
$OR^2$ independently of one another is represented by an alkoxy group, where $R^2$ is an alkyl group having one to 5 carbon atoms, e.g. methyl, ethyl, isopropyl, n-propyl, n-butyl, isobutyl, sec-butyl, and/or $OR^2$ is a phenoxy group, a naphthyloxy group, a phenoxy group, which is substituted at the ortho-, meta- and/or para-position, with a $C_1$-$C_{20}$ alkyl, alkylaryl, alkoxy, phenyl, substituted phenyl, thioalkyl, nitro, halogen, nitrile, carboxyalkyl, carboxyamide, —$NH_2$ and/or NHR group, in which R is a linear, branched or cyclic $C_1$-$C_{20}$ alkyl group, e.g. methyl, ethyl, propyl (n-, iso-), butyl (n-, iso-, sec-) or phenyl, and
n is represented by 0, 1, 2 or 3.

As silylating component it is also possible, however, for mixtures of at least two of the stated compounds to be present in the polymer.

In one preferred embodiment, silylating components of interest are more particularly alkoxysilanes comprising isocyanate groups or amino groups. Suitable alkoxysilanes comprising amino groups are more particularly compounds which are selected from the group consisting of 3-aminopropyltrimethoxysilane, 3-aminopropyltriethoxysilane, 3-aminopropylmethyldimethoxysilane, 3-aminopropylmethyldiethoxysilane, 3-amino-2-methylpropyltrimethoxysilane, 4-aminobutyltrimethoxysilane, 4-aminobutylmethyldimethoxysilane, 4-amino-3-methylbutyltrimethoxysilane, 4-amino-3,3-dimethylbutyltrimethoxysilane, 4-amino-3,3-dimethylbutyldimethoxymethylsilane, aminomethyltrimethoxysilane, aminomethyldimethoxymethylsilane, aminomethylmethoxydimethylsilane, aminomethyltriethoxysilane, aminomethyldiethoxymethylsilane, aminomethylethoxydimethylsilane, N-methyl-3-aminopropyltrimethoxysilane, N-methyl-3-aminopropyldimethoxymethylsilane, N-ethyl-3-aminopropyltrimethoxysilane, N-ethyl-3-aminopropyldimethoxymethylsilane, N-butyl-3-aminopropyltrimethoxysilane, N-butyl-3-aminopropyldimethoxymethylsilane, N-cyclohexyl-3-aminopropyltrimethoxysilane, N-cyclohexylaminomethyltriethoxysilane, cyclohexylaminomethyltrimethoxysilane, N-phenyl-3-aninopropyltrimethoxysilane, N-methyl-3-amino-2-methylpropyltrimethoxysilane, N-methyl-3-amino-2-methylpropyldimethoxymethylsilane, N-ethyl-3-amino-2-methylpropyltrimethoxysilane, N-ethyl-3-amino-2-methylpropyldimethoxymethylsilane, N-ethyl-3-aminopropyldimethoxymethylsilane, N-ethyl-3-aminopropyltrimethoxysilane, N-phenyl-4-aminobutyltrimethoxysilane, N-phenylaminomethyldimethoxymethylsilane, N-phenylaminomethyltrimethoxysilane, N-cyclohexylaminomethyldimethoxymethylsilane, N-cyclohexylaminomethyltrimethoxysilane, N-methylaminomethyldimethoxymethylsilane, N-methylaminomethyltrimethoxysilane, N-ethylaminomethyldimethoxymethylsilane, N-ethylaminomethyltrimethoxysilane, N-propylaminomethyldimethoxymethylsilane, N-propylaminomethyltrimethoxysilane, N-butylaminomethyldimethoxymethylsilane, N-butylaminomethyltrimethoxysilane, N-(2-aminoethyl)-3-aminopropyltrimethoxysilane, N-(2-aminoethyl)-3-aminopropylmethyldimethoxysilane, 3-[2-(2-aminoethylamino)ethylamino]propyltrimethoxysilane, bis(trimethoxysilylpropyl)amine, bis(dimethoxy(methyl)silylpropyl)amine, bis(trimethoxysilylmethyl)amine, bis(di-methoxy(methyl)silylmethyl)amine, 3-ureidopropyltrimethoxysilane, N-methyl[3-(trimethoxysilyl)propyl]carbamates, N-trimethoxysilylmethyl-O-methylcarbamate, N-dimethoxy(methyl)silylmethylcarbamate and the analogues thereof having ethoxy or isopropoxy groups or n-propoxy groups or n-butoxy groups or isobutoxy groups or sec-butoxy groups instead of the methoxy groups on the silicon.

Suitable alkoxysilanes comprising isocyanate groups are more particularly compounds which are selected from the group consisting of isocyanatopropyltriethoxysilane, isocyanatopropyltrimethoxysilane, isocyanatopropylmethyldiethoxysilane, isocyanatopropylmethyldimethoxysilane, isocyanatomethyltrimethoxysilane, isocyanatomethyltriethoxysilane, isocyanatomethylmethyldiethoxysilane, isocyanatomethylmethyldimethoxysilane, isocyanatomethyldimethylmethoxysilane or isocyanatomethyldimethylethoxysilane, and also their analogues having isopropoxy or n-propoxy groups.

With regard to the silylated polyurethanes for preferred use in accordance with the present invention, and to their preparation, reference is made, furthermore, to patent applications U.S. Pat. Nos. 3,632,557, 5,364,955, WO 01/16201, EP 931800, EP 1093482 B1, US 2004 260037, US 2007167598, US 2005119421, U.S. Pat. No. 4,857,623, EP 1245601, WO 2004/060953, and DE 2307794, the content of which is hereby adopted into the present specification.

The acrylates which can be used in accordance with the invention are compounds which include at least one monomer from the series of the acrylic esters and methacrylic esters, with preferably at least 70% by weight of the polymer being composed of at least one compound from the series of the acrylic esters, methacrylic esters and styrenes.

The monomers of the acrylate component preferably comprise at least one compound from the series ethyldiglycol acrylate, 4-tert-butylcyclohexyl acrylate, dihydrocyclopentadienyl acrylate, lauryl(meth)acrylate, phenoxyethyl(meth)acrylate, isobornyl(meth)acrylate, dimethylaminoethyl(meth)acrylate, cyanoacrylates, citraconate, itaconate and derivatives thereof, (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-propylheptyl(meth)acrylate, 2-ethylhexyl(meth)acrylate, nonyl(meth)acrylate, decyl(meth)acrylate, isodecyl(meth)acrylate, dodecyl(meth)acrylate, phenyl(meth)acrylate, tolyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylates, γ-(methacryloyloxypropyl)trimethoxysilane, ethylene oxide adducts of (meth)acrylic acid, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl(meth)acrylate and 2-perfluorohexadecylethyl(meth)acrylate.

In one particular embodiment the monomers in question are two or more monomers from the series n-butyl(meth)acrylate, 2-hydroxyethyl(meth)acrylate, acrylic acid, methacrylic acid and methyl methacrylate.

Another embodiment uses copolymers of at least two of all of the aforementioned monomers, the proportion being selected in the form such that the resultant copolymers have the desired performance properties for adhesives and sealants. The skilled person is aware of suitable copolymers having the desired performance properties. Preference is given more particularly to copolymers of n-butyl acrylate and methyl methacrylate, which are used in a molar ratio at which the resultant copolymer possesses a glass transition temperature which lies between those of the corresponding homopolymers. All in all, the acrylates of the present invention may be either copolymers or homopolymers.

The acrylic acid polymers may also, furthermore, comprise other ethylenically unsaturated monomers, examples being isoprenol or hydroxybutyl vinyl ether. Examples here include mono- and polyunsaturated hydrocarbon monomers, vinyl esters (e.g. vinyl esters of $C_1$ to $C_6$ saturated monocarboxylic acids), vinyl ethers, monoethylenically unsaturated monocarboxylic and polycarboxylic acids and alkyl esters of these monocarboxylic and polycarboxylic acids (e.g. acrylic esters and methacrylic esters such as, for instance, $C_1$ to $C_{12}$ alkyl and more particularly $C_1$ to $C_4$ alkyl esters), amino monomers and nitriles, vinyls and alkylvinylidenes and amides of unsaturated carboxylic acids. Also suitable are unsaturated hydrocarbon monomers comprising styrene compounds (e.g. styrene, carboxylated styrene and alpha-methylstyrene), ethylene, propylene, butylene and conjugated dienes (butadiene, isoprene and copolymers of butadiene and isoprene). The vinyl and halovinylidene monomers include vinyl chloride, vinylidene chloride, vinyl fluoride and vinylidene fluoride. Examples of the vinyl esters include aliphatic vinyl esters, such as vinyl formate, vinyl acetate, vinyl propionate, vinyl butyrate, vinyl isobutyrate, vinyl valerate, vinyl caproate and allyl esters of saturated monocarboxylic acids such as allyl acetate, allyl propionate and allyl lactate. The vinyl ethers include methyl vinyl ether, ethyl vinyl ether and n-butyl vinyl ether. Typical vinyl ketones include methyl vinyl ketones, ethyl vinyl ketones and isobutyl vinyl ketones. Examples of the dialkyl esters of monoethylenically unsaturated dicarboxylic acids are dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate and dioctyl itaconate. In particular the monoethylenically unsaturated monocarboxylic acids are acrylic acid, methacrylic acid, ethacrylic acid and crotonic acid. The monoethylenically unsaturated dicarboxylic acids include maleic acid, fumaric acid, itaconic acid and citric acid. As monoethylenically unsaturated tricarboxylic acids it is possible, with a view to the present invention, to make use, for example, of aconitic acid and its halogen-substituted derivatives. It is possible, furthermore, to use the anhydrides and esters of the aforementioned acids (e.g. maleic anhydride and citric anhydride). Examples of nitriles of ethylenically unsaturated monocarboxylic, dicarboxylic and tricarboxylic acids include acrylonitrile, α-chloroacrylonitrile and methacrylonitrile. The amides of the carboxylic acids may be acrylamides, methacrylamides and other α-substituted acrylamides and N-substituted amides, e.g. N-methylolacrylamide, N-methylolmethylacrylamide, alkylated N-methylolacrylamides and N-methylolmethacrylamides (e.g. N-methoxymethylacrylamide and N-methoxymethylmethacrylamide). Amino monomers used may be substituted and unsubstituted aminoalkyl acrylates, hydrochloride salts of the amino monomers, and methacrylates such as, for instance, β-aminoethyl acrylate, β-aminoethyl methacrylate, dimethylaminomethyl acrylate, β-methylaminoethyl acrylate and dimethylaminomethyl methacrylate. In the context of the present invention, with regard to the cationic monomers, mention may be made of α- and β-ethylenically unsaturated compounds which are suitable for polymerization and contain primary, secondary or tertiary amino groups, examples being dimethylaminoethyl methacrylate, dimethylaminoneopentyl acrylate, dimethylaminopropyl methacrylate and tert-butylaminoethyl methacrylate, or organic and inorganic salts of these compounds, and/or alkylammonium compounds such as, for instance, trimethylammonioethyl methacrylate chloride, diallyldimethylammonium chloride, β-acetamidodiethylaminoethyl acrylate chloride and methacrylamidopropyltrimethylammonium chloride. These cationic monomers may be used alone or in combination with the aforementioned further monomers. Examples of hydroxy-containing monomers also include the β-hydroxyethyl(meth)acrylates, β-hydroxypropyl(meth)acrylates, γ-hydroxypropyl(meth)acrylates.

The silyl-terminated acrylates which can be used in accordance with the invention are constructed from at least one acrylate component and at least one silyl component. The silyl-terminated acrylates may be obtained, for example, from the reaction of alkenyl-terminated acrylates by hydrosilylation, the alkenyl-terminated acrylates being preparable by atom transfer radical polymerization (ATRP) or being preparable from the reaction of alkyl-terminated acrylates with a monomer comprising silyl groups, the alkenyl-terminated acrylates being preparable via atom transfer radical polymerization (ATRP).

Suitable monomers for the synthesis of the acrylate component are all of the compounds stated for the above-described preparation of the polyacrylates.

Where the silyl component is attached by hydrosilylation to the acrylate component, suitable silyl components include more particularly trimethylchlorosilane, dimethyldichlorosilane, methyltrichlorosilane, hexamethyldisilazane, trichlorosilane, methyldichlorosilane, dimethylchlorosilane, phenyldichlorosilane and also trimethoxysilane, triethoxysilane, methyldiethoxysilane, methyldimethoxysilane and phenyldimethoxysilane, and also methyldiacetoxysilane, phenyldiacetoxysilane, bis(dimethylketoximat)methylsilane and bis(cyclohexylketoximat)methylsilane. Preferred in this case more particularly are the halosilanes and alkoxysilanes.

Where the silyl component is attached to the acrylate component by a monomer comprising silyl groups, suitable silyl components include more particularly 3-(meth)acryloyloxypropyltrimethoxysilane, 3-(meth)acryloyloxypropylmethyldimethoxysilane, 3-(meth)acryloyloxypropyltriethoxysilane, 3-(meth)acryloyloxypropylmethyldiethoxysilane, (meth)acryloyloxymethyltrimethoxysilane, (meth)acryloyloxymethylmethyldimethoxysilane, (meth)acryloyloxymethyltriethoxysilane and (meth)acryloyloxymethylmethyldiethoxysilane.

The silyl-terminated acrylates of the invention preferably possess a weight-average molecular weight of between 500 and 200 000 g/mol, more preferably between 5000 and 100 000 g/mol.

With regard to the silyl-terminated acrylates for preferred use in accordance with the present invention, reference is made to patent application EP 1498433 and to Chem. Rev. (2001), 101, 2921-2990, Atom Transfer Radical Polymerization, Krzysztof Matyjaszewski and Jianhui Xia, and to Progress in Polymer Science 32 (2007), 93-146, Controlled/living radical polymerization: Features, developments, and perspectives, Wade A. Braunecker, Krzysztof Matyjaszewski, Elsevier, the content of which is hereby adopted into the present specification.

The polysulphides which can be used in accordance with the invention are organic polymers which have sulphide bonds in the polymer. These may be, by way of example, a product of the reaction of an organic dihalide with sodium disulphide. Examples of the organic dihalides include aliphatic dihalides (e.g. bis-chloroethylformal) and vinyl halides. Thus, for example, the reaction of bis-chloroethylformal with a sodium disulphide solution leads to a polymer of the following structure:

in which "n" denotes the number of monomers in the polymer and "x" the number of successive sulphide bonds in the monomer (x may vary in the monomers of the same molecule). High molecular mass polymers of this kind may then be reacted to shorter-chain polymers with terminal thiol groups (for example by reductive reaction with NaSH and $Na_2SO_2$, and subsequent acidification). In this way, liquid, bridged polysulphides are obtained with terminal thiol end groups, which in specific embodiments have a molecular weight in the range from 1000 to 8000. The liquid polymers may then be cured to form elastomeric solids, as for example by the oxidation of the thiol end groups to disulphite bridges, using an oxidizing reagent such as, for instance, lead oxide, manganese dioxide, para-quinone dioxime and zinc peroxide. For the purposes of the present invention, the polysulphide adhesives and sealants encompass all polysulphide polymers which can be converted to a solid by curing. In specific embodiments the polysulphide adhesives and sealants comprise 30 to 90% by weight of at least one liquid polysulphide polymer, 2 to 50% by weight of a filler, 2 to 10% by weight of a cyclohexanepolycarboxylic acid derivative, 1 to 3% by weight of a water scavenger and between 6 and 15% by weight of further ingredients such as, for instance, adhesion promoters, solvents and curing agents. An example of the preparation of polysulphide adhesives and sealants is disclosed in U.S. Pat. No. 3,431,239, with this method being incorporated into the present specification by reference. Polysulphide adhesives and sealants can be used as one- or two-component systems.

The silylated polysulphides which can be used preferably in accordance with the invention are constructed from at least one polysulphide component and at least one silylating component, and are represented preferably by the following simplified formula:

$(CH_3)_3-Si-S-(C_2H_4OCH_2OC_2H_4S_x)_n-C_2H_4OCH_2OC_2H_4S-Si-(CH_3)_3$

These preferred silylated polysulphides are prepared by the following process:

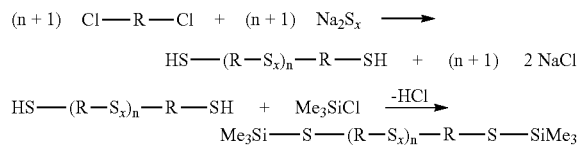

where R is represented by an alkyl group or an ether group.

With regard to the silylated polysulphides whose use is preferred in accordance with the present invention, reference is made to the publication "ALPIS Aliphatische Polysulfide", Hüthing & Wepf, Basle, 1992, Heinz Lucke, ISBN 3-85739-1243, the content of which is hereby adopted into the present specification.

The silylated polyethers which can be used in accordance with the invention are constructed from at least one polyether component and at least one silylating component. For some time, construction sealants have been on the market that comprise so-called MS-Polymer % from Kaneka and/or Excestar from Asahi Glass Chemical, where "MS" stands for "modified silicone". These silyl-terminated polyethers are particularly suitable for the present invention. They are polymers which are composed of polyether chains with silane end groups, prepared by the hydrosilylation of terminal double bonds. The silane end groups are composed of a silicon which is attached to the polyether chain and to which two alkoxy groups and one alkyl group, or three alkoxy groups, are attached. As a result of the reaction with moisture, the alkoxy groups undergo hydrolysis to form alcohols, and the resultant Si—OH groups subsequently condense to form an Si—O—Si network.

Suitable polyether components for the silyl-terminated polyethers include, among others, the polyols that are prepared, using starter molecules, from styrene oxide, propylene oxide, butylene oxide, tetrahydrofuran or epichlorohydrin. Especially suitable are polypropylene oxide, polybutylene oxide, polyethylene oxide and tetrahydrofuran or mixtures thereof. In this case, preference is given in particular to molecular weights between 500 and 100 000 g/mol, especially 3000 and 20 000 g/mol.

For the purpose of introducing the double bonds, the polyether is reacted with organic compounds comprising a halogen atom selected from the group consisting of chlorine, bromine and iodine, and with a terminal double bond. Particularly suitable for this purpose are allyl chlorides, allyl bromides, vinyl(chloromethyl)benzene, allyl(chloromethyl) benzene, allyl(bromomethyl)benzene, allyl chloromethyl ether, allyl(chloromethoxy)benzene, butenyl chloromethyl ether, 1,6-vinyl(chloromethoxy)benzene, with the use of allyl chloride being particularly preferred.

The resulting polyethers with terminal double bonds are reacted by hydrosilylation to form the silyl-terminated polyethers. Particularly suitable hydrosilylating agents for this reaction include trichlorosilane, methyldichlorosilane, dimethylchlorosilane, phenyldichlorosilane and also trimethoxysilane, triethoxysilane, methyldiethoxysilane, methyldimethoxysilane and phenyldimethoxysilane, and also methyldiacetoxysilane, phenyldiacetoxysilane, bis(dimethylketoximato)methylsilane and bis(cyclohexylketoximato) methylsilane. Particularly preferred in this context are the halosilanes and alkoxysilanes.

Reference is made, furthermore, to patent applications U.S. Pat. No. 3,971,751, EP 0319896, U.S. Pat. No. 4,618, 653, EP 0184829, EP 0265929, EP 1285946, EP 0918062, Adhesives and Sealants—Technology, Applications and Markets, David J. Drunn, ISBN 1-85957-365-7, Rapra Technology Limited, 2003 and Congress proceedings 27 Apr. 2005 Stick 4th European Congress on Adhesive and Sealant Raw Materials, Innovative Raw Materials for Structural Adhesives, ISBN 3-87870-156-X, Vincenz Network, 2005, the content of which is hereby adopted into the present specification.

Besides components (A) and (B), the composition of the invention may comprise additional, further components. These may be, among others, the following auxiliaries and additives:

Adhesion promoters, examples being epoxysilanes, anhydridosilanes, adducts of silanes with primary aminosilanes, ureidosilanes, aminosilanes, diaminosilanes, and also their analogues in the form of monomer or oligomer and urea-silanes; e.g. Dynasylan AMEO, Dynasylan AMMO, Dynasylan DAMO-T, Dynasylan 1146, Dynasylan 1189, Silquest A-Link 15, epoxy resins, alkyl titanates, titanium chelates, aromatic polyisocyanates, phenolic resins; which conform, for example, to the general formula:

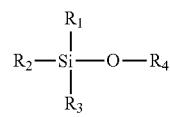

in which
$R_1$, $R_2$ and $R_3$ independently of one another are halogen, amine, hydrogen, alkoxy, acyloxy, alkyl, aryl, aralkyloxy, alkylaryl or aralkyl groups and also
alkyl group with olefinic groups, halides, amino, carbonyl, epoxy and glycidyloxy, ester, hydroxyimino, mercapto and sulphido, isocyanato, anhydrido, acryloyloxy, metharyloyloxy and vinyl groups, and also
aryl group with olefinic groups, halides, amino, carbonyl, epoxy and glycidyloxy, ester, hydroxyimino, mercapto and sulphido, isocyanato, anhydrido, acryloyloxy, metharyloyloxy and vinyl groups, and also
alkylaryl group with olefinic groups, halides, amino, carbonyl, epoxy and glycidyloxy, ester, hydroxyimino, mercapto and sulphido, isocyanato, anhydrido, acryloyloxy, metharyloyloxy and vinyl groups, and also
aralkyl group with olefinic groups, halides, amino, carbonyl, epoxy and glycidyloxy, ester, hydroxyimino, mercapto and sulphido, isocyanato, anhydrido, acryloyloxy, metharyloyloxy, and vinyl groups, and
$R^4$ is alkyl and aryl.
Water scavengers, e.g. vinyltriethoxysilane, vinyltrimethoxysilane, a-functional silanes such as N-(silylmethyl)-O-methyl-carbamates, more particularly N-(methyldimethoxysilylmethyl)-O-methyl-carbamate, (methacryloyloxymethyl)silanes, methoxymethylsilanes, N-phenyl-, N-cyclohexyl- and N-alkylsilanes, orthoformic esters, calcium oxide or molecular sieve;

catalysts, examples being metal catalysts in the form of organotin compounds such as dibutyltin dilaurate and dibutyltin diacetylacetonate, organobismuth compounds or bismuth complexes; compounds containing amino groups, examples being 1,4-diazabicyclo[2.2.2]octane and 2,2'-dimorpholinodiethyl ether, 1,8-diazabicyclo[5.4.0]undec-7-enes, 1,5-diazabicyclo[4.3.0]non-5-enes, and also aminosilanes. Further suitable metal catalysts include titanium, zirconium, bismuth, zinc and lithium catalysts, and also metal carboxylates, it also being possible to use combinations of different metal catalysts;

light stabilizers and ageing inhibitors, which act in particular as stabilizers against heat, light and UV radiation, examples being phenolic antioxidants which function as free-radical scavengers, such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), 5-tetrakis[methylene-3-(3,5-di-tert-butyl-4-hydroxyphenyl)propionate]methanes and 1,1,3-tris(2-methyl-4-hydroxy-5-tert-butylphenyl)butanes, and antioxidants based on amines (for example phenyl-β-naphthylamine, α-naphthylamine, N,N'-di-sec-butyl-p-phenylenediamine, phenothiazine and N,N'-diphenyl-p-phenylenediamines);

flame retardants, e.g. Al(OH)$_3$, huntite, brominated alkyl and aryl compounds;

biocides, such as, for example, algicides, fungicides or fungal growth inhibitor substances, e.g. Ag, Ag$^+$, compounds which give off $CH_2O$—;

fillers, e.g. ground or precipitated calcium carbonates, which optionally are coated with fatty acids or fatty acid mixtures, e.g. stearates, more particularly finely divided, coated calcium carbonate, carbon blacks, especially industrially manufactured carbon blacks, kaolins, aluminium oxides, silicas, more particularly highly disperse silica from pyrolysis processes, PVC powders or hollow beads. Preferred fillers are carbon black, calcium carbonates, such as precipitated or natural chalks such as Omya 5 GU, Omyalite 95 T, Omyacarb 90 T, Omyacarb 2 T-AV® from Omya, Ultra P-Flex® from Specialty Minerals Inc, Socal® U1S2, Socal® 312, Winnofil® 312 from Solvay, Hakuenka® from Shiraishi, highly disperse silicas from pyrolysis processes, and combinations of these fillers. Likewise suitable are minerals such as siliceous earth, talc, calcium sulphate (gypsum) in the form of anhydrite, hemihydrate or dihydrate, finely ground quartz, silica gel, precipitated or natural barium sulphate, titanium dioxide, zeolites, leucite, potash feldspar, biotide, the group of soro-, cyclo-, ino-, phyllo- and hectosilicates, the group of low-solubility sulphates such as gypsum, anhydrite or heavy spar (BaSO$_4$), and also calcium minerals such as calcite, metals in powder form (aluminium, zinc or iron, for example), and barium sulphate;

rheology modifiers, such as thickeners, e.g. urea compounds and also mono-amines, e.g. n-butylamine, methoxybutylamine and polyamide waxes, bentonites, silicones, polysiloxanes, hydrogenated castor oil, metal soaps, such as calcium stearate, aluminium stearate, barium stearate, precipitated silica, fumed silica and also poly(oxy-1,2-ethanediyl)-α-hydro-Ω-hydroxy polymer with oxy-1,2-ethanediyl-α-hydro-Ω-hydroxy-nonylphenoxyglycidyl ether oligomers and 5-isocyanato-1-(isocyanatomethyl)-1,3,3-trimethylcyclohexane or hydroxyethylcellulose or polyacrylic acid polymers and copolymers;

surface-active substances such as, for example, wetting agents, levelling agents, deaerating agents, defoamers and dispersants;

fibres, as for example of carbon, polyethylene or polypropylene, $SiO_2$, cellulose;

pigments, e.g. titanium dioxide;

solvents such as, for instance, water, solvent naphtha, methyl esters, aromatic hydrocarbons such as polyalkylbenzenes, toluene and xylene, solvents based on esters such as ethyl acetate, butyl acetate, allyl acetate and cellulose acetate, and solvents based on ketones such as methyl ethyl ketone, methyl isobutyl ketone and diisobutyl ketone, and also acetone, and mixtures of at least two of the aforementioned solvents;

and also further substances used in adhesives and sealants.

As further components the adhesives and sealants of the invention may comprise further plasticizers. These may be, in particular, C4 to C8 alkyl terephthalates of the following general formula:

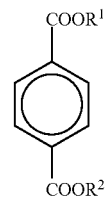

$R^1$ and $R^2$ are each branched or unbranched alkyl or cycloalkyl groups having 4 to 8 saturated and unsubstituted carbon atoms, and $R^1$ and $R^2$ may each represent identical or different radicals. Suitable in this context is virtually any alkyl or cycloalkyl group which is covered by the definition above. Examples include 2-ethylhexyl, n-octyl, 2-methylpentyl, isobutyl, n-butyl, tert-butyl, pentyl, isopentyl, neopentyl, hexyl, heptyl, and isoheptyl. In different embodiments the terephthalates may be selected from a smaller group of terephthalates, such as, for instance, the C4 to C7 alkyl terephthalates, $C_4$ to $C_6$ alkyl terephthalates, C6 to C8 alkyl terephthalates or C5 to C8 alkyl terephthalates, or from the groups of the C4 to C5 alkyl terephthalates, C5 to C6 alkyl terephthalates, $C_6$ to $C_7$ alkyl terephthalates or $C_7$ to $C_8$ alkyl terephthalates. In one specific embodiment, $R^1$ and $R^2$ are each an n-butyl group, giving di-n-butyl terephthalate. In another embodiment, $R^1$ and $R^2$ may each be isobutyl groups, giving diisobutyl terephthalate. In a particularly preferred embodiment, $R^1$ and $R^2$ are 2-ethylhexyl groups, giving bis-2-ethylhexyl terephthalate, which is also referred to as di-2-ethylhexyl terephthalate (DEHT). A product of this kind is available commercially under the name DEHT-Eastman™ 168.

Furthermore, the plasticizer may also be at least one of the following compounds: glyceryl triacetate (triacetin), 2,2,4-trimethyl-1,3-pentanediol diisobutyrates, phthalic esters such as, for instance, dioctyl phthalate, di-2-ethylhexyl phthalate (DEHP), diisooctyl phthalate (DIOP), diisononyl phthalate (DINP), di-n-nonyl phthalate, n-nonyl n-undecyl phthalate, di-n-undecyl phthalate, diundecyl phthalate (DUP), diisodecyl phthalates (DIDP), phthalates with linear $C_6$ to $C_{10}$ radicals, ditridecyl phthalate (DTDP), undecyl dodecyl phthalate, di(2-propylheptyl) phthalate, nonyl undecyl phthalate, Texanol benzyl phthalate, polyester phthalate, diallyl phthalate, n-butylphthalyl n-butylglycosate, dicaprylyl phthalate, butyl cyclohexyl phthalate (BCP), dicyclohexyl phthalate or butyl octyl phthalate, dioctyl adipate (DOA), di-2-ethylhexyl adipate, diisononyl adipate (DINA), diisooctyl adipate (DIOA), diisodecyl adipate, ditridecyl adipate (DITA), dibutoxyethyl adipate, dibutoxyethoxy adipate, di(n-octyl) adipate, polyester adipates, polyglycol adipates, trioctyl trimellitates, tri-2-ethylhexyl trimellitate (TOTM), triisooctyl trimellitate (TIOTM), triisononyl trimellitate, triisodecyl trimellitate, tri-n-hexyl trimellitate, dioctyl azelate (DOZ), di-2-ethylhexyl glutarate, di-2-ethylhexyl sebacate, dibutyl sebacate, dibutoxyethyl sebacate, triethyl citrate, acetyl triethyl citrate, tri-n-butyl citrate, acetyl tri-n-butyl citrate, acetyl tri-n-hexyl citrate, n-butyl tri-n-hexyl citrate, isodecyl benzoate, diethylene glycol dibenzoate, dipropylene glycol dibenzoate, triethylene glycol dibenzoate, 1,4-cyclohexanedimethanol dibenzoate, 2,2,4-trimethyl-1,3-pentanediol dibenzoate, 2,2-dimethyl-1,3-propanediol dibenzoates, $C_{10}$-$C_{21}$ alkanoic acid phenol esters or alkylsulphonic acid phenol esters, reaction products of acetic acid with hydrogenated castor oil, pentaerythritol tetrabenzoate, glycerol tribenzoate, polypropylene glycol dibenzoate, friaryl phosphates, polymers of adipic acid, phthalates, adipates and/or sebacates with glycol, butyl benzyl phthalate, alkyl benzyl phthalate, $C_7$-$C_9$ butyl phthalates, diethylene glycol dibenzoate, dipropylene glycol dibenzoate, 2-ethylhexyl benzoate, $C_9$ benzoates, $C_{10}$ benzoates, Texanol benzoate, ethylene glycol dibenzoate, propylene glycol dibenzoate, triethylene glycol dibenzoate, diheptyl phthalate (DHP), dihexyl phthalate, dimethyl phthalate, diethyl phthalate, dibutyl phthalate, and diisobutyl phthalate.

Esters of an aliphatic or aromatic dicarboxylic or tricarboxylic acid with a $C_{10}$ alcohol component comprising 2-propylheptanol or a $C_{10}$ alcohol mixture comprising 2-propylheptanol and at least one of the $C_{10}$ alcohols 2-propyl-4-methylhexanol, 2-propyl-5-methylhexanol, 2-isopropylheptanol, 2-isopropyl-4-methylhexanol, 2-isopropyl-5-methylhexanol and/or 2-propyl-4,4-dimethylpentanol may also be used as plasticizers, the aliphatic or aromatic dicarboxylic or tricarboxylic acid being selected from the group consisting of citric acid, phthalic acid, isophthalic acid, terephthalic acid, and trimellitic acid.

The expression "alcohol component" is used in order to take account of the circumstance that, in the $C_{10}$ ester mixtures of the invention, the stated $C_{10}$ alcohols are present in esterified form.

The $C_{10}$ alcohol component of the $C_{10}$ ester mixtures of the invention comprises substantially 2-propylheptanol or mixtures of 2-propylheptanol with one or more of its isomers 2-propyl-4-methylhexanol, 2-propyl-5-methylhexanol, 2-isopropylheptanol, 2-isopropyl-4-methylhexanol, 2-isopropyl-5-methylhexanol and/or 2-propyl-4,4-dimethylpentanol. These compounds are referred to below for short as "propylheptanol isomers". The presence of other isomers of the 2-propylheptanol component—originating, for example, from the alcohols 2-ethyl-2,4-dimethylhexanol, 2-ethyl-2-methylheptanol and/or 2-ethyl-2,5-dimethylhexanol, which are isomeric with 2-propylheptanol—in the inventive $C_{10}$ alcohol component is possible. Owing to the low rates of formation of the aldehydic precursors of these isomers in the course of the aldol condensation, these precursors, if at all, are present only in traces in the $C_{10}$ alcohol component and play virtually no part in the plasticizer properties of the plasticizers comprising the inventive $C_{10}$ alcohol component.

In one preferred embodiment the adhesive or sealant comprises as plasticizer at least one cyclohexanepolycarboxylic acid derivative of the formula (I),

in which
$R^1$ is $C_1$-$C_{10}$ alkyl or $C_3$-$C_8$ cycloalkyl,
m is 0, 1, 2, 3 or 4,
n is 2, 3 or 4, and
R is hydrogen or $C_1$-$C_{30}$ alkyl, $C_1$-$C_{30}$ alkoxy, $C_3$-$C_8$ cycloalkyl, $C_6$-$C_{30}$ arylphenyl or $C_1$-$C_{30}$ alkyl-cycloalkyl, with at least one radical R being $C_1$-$C_{30}$ alkyl, $C_1$-$C_{30}$ alkoxy or $C_3$-$C_8$ cycloalkyl.

In the formula (I) the radicals $R^1$ may be alike or different when m=2, 3 or 4. The $C_1$-$C_{10}$ alkyl groups may be linear or branched. If $R^1$ is an alkyl group, it is preferably a $C_1$-$C_8$ alkyl group, more preferably a $C_1$-$C_8$ alkyl group. Examples of such alkyl groups are methyl, ethyl, n-propyl, isopropyl, n-butyl, isobutyl, sec-butyl, tert-butyl, n-pentyl, n-hexyl, n-octyl, and 2-ethylhexyl. Preferably m is 0.

The radicals R may be alike or different. The $C_1$-$C_{30}$ alkyl groups and the alkyl radicals of the $C_1$-$C_{30}$ alkoxy groups may be linear or branched. R is preferably $C_1$-$C_{30}$ alkyl, $C_1$-$C_{20}$ alkyl, more preferably $C_1$-$C_{18}$ alkyl, very preferably $C_1$-$C_{13}$ alkyl. Examples of such alkyl groups are the alkyl groups already stated for $R^1$, and also n-nonyl, isononyl, n-decyl, isodecyl, n-undecyl, isoundecyl, n-dodecyl, isododecyl, n-tridecyl, isotridecyl, stearyl, and n-eicosyl.

With regard to the alkyl groups, the situation in each case may be that of individual isomers of the stated alkyl groups, or mixtures of different alkyl groups. The different alkyl groups may be different isomers with the same number of carbon atoms and/or may be alkyl groups which have a different number of carbon atoms.

The cyclohexanepolycarboxylic acid derivatives used in accordance with the invention are more particularly mono-, di-, tri-, tetra-esters and anhydrides of the cyclohexanepolycarboxylic acids. Preferably all of the carboxylic acid groups are in esterified form. The esters used are alkyl, cycloalkyl, and alkoxyalkyl esters, preferably alkyl esters, with preferred alkyl groups R having already been stated above.

The at least one cyclohexanepolycarboxylic acid derivative is preferably selected from the group consisting of ring-hydrogenated monoalkyl and dialkyl esters of phthalic acid, isophthalic acid, and terephthalic acid, ring-hydrogenated monoalkyl, dialkyl and trialkyl esters of trimellitic acid, of trimesic acid and of hemimellitic acid, or monoalkyl, dialkyl, trialkyl, and tetraalkyl esters of pyromellitic acid, it being possible for the alkyl groups R to be linear or branched, said alkyl groups R having in each case 1 to 30, preferably 1 to 20, more preferably 1 to 18, very preferably 1 to 13 carbon atoms, and mixtures of two or more thereof. Suitable alkyl groups R have already been stated above.

Additionally suitable for the purposes of the present invention are the cyclohexane-1,2-dicarboxylic esters that are disclosed in WO 2010/028870. The content of WO 2010/028870, from page 4 line 33 to page 31 line 17, is incorporated by reference into the present specification.

Also suitable, furthermore, are the cyclohexane-1,2-dicarboxylic esters disclosed in WO 99/32427. The content of WO 99/32427, from page 21 line 1 to page 22 line 15, is incorporated by reference into the present specification.

In accordance with the invention it is also possible to use hydrogenation products of phthalic acid mixed esters with $C_{10}$ and $C_{13}$ alcohols, of the kind described in DE-A 100 32 580.7.

Additionally considered suitable for the purposes of the present invention are the hydrogenation products of the commercially available benzenecarboxylic esters with the trade names Jayflex DINP (CAS No. 68515-48-0), Jayflex DIDP (CAS No. 68515-49-1), Palatinol 9-P, Vestinol 9 (CAS No. 28553-12-0), TOTM-I (CAS No. 3319-31-1), Linplast 68-TM, Palatinol N (CAS No. 28553-12-0), Jayflex DHP (CAS No. 68515-50-4), Jayflex DIOP (CAS No. 27554-26-3), Jayflex UDP (CAS No. 68515-47-9), Jayflex DIUP (CAS No. 85507-79-5), Jayflex DTDP (CAS No. 68515-47-9), Jayflex L9P (CAS No. 68515-45-7), Jayflex L911P (CAS No. 68515-43-5), Jayflex L11P (CAS No. 3648-20-2), Witamol 110 (CAS No. 90193-91-2), Witamol 118 (Di-n-$C_8$-$C_{10}$-alkyl phthalate), Unimoll BB (CAS No. 85-68-7), Linplast 1012 BP (CAS No. 90193-92-3), Linplast 13 XP (CAS No. 27253-26-5), Linplast 610 P (CAS No. 68515-51-5), Linplast 68 FP (CAS No. 68648-93-1) and Linplast 812 HP (CAS No. 70693-30-0), Palatinol AH (CAS No. 117-81-7), Palatinol 711 (CAS No. 68515-42-4), Palatinol 911 (CAS No. 68515-43-5), Palatinol 11 (CAS No. 3648-20-2), Palatinol Z (CAS No. 26761-40-0) and Palatinol DIPP (CAS No. 84777-06-0).

Particularly preferred adhesives and sealants of the invention comprise dialkyl esters of 1,2-cyclohexanedicarboxylic acid. Preferred as ester group R are linear or branched alkyl groups having 1 to 13 C atoms, or mixtures of the stated alkyl groups. Particularly preferred as ester group R are linear or branched alkyl groups having 8 to 10 C atoms, or mixtures of the stated alkyl groups. Especially preferred as ester group R are alkyl groups having 9 C atoms. With particular preference the compound in question is diisononyl 1,2-cyclohexanedicarboxylate.

In one embodiment the adhesive or sealant of the invention comprises 10 to 90% by weight of component (A), 0.32 to 50% by weight of component (B), 0 to 80% by weight of fillers and 0 to 20% by weight of rheology modifiers. In one preferred embodiment, 1 to 80% by weight of fillers, 0 to 50% by weight of water and/or solvents and 0.5 to 20% by weight of rheology modifiers are present. Also considered as being preferred is an amount of 25 to 40% by weight of component (A), 0.4 to 40% by weight of component (B), 30 to 55% by weight of fillers, 0 to 10% by weight of water and 1 to 10% by weight of rheology modifiers.

The adhesive or sealant of the invention preferably comprises component (B) in an amount of between 0.5% to 35% by weight, more particularly between 0.8% to 30% by weight, and with particular preference between 1% to 20% by weight, based on the overall adhesive or sealant.

In the case of the polyurethanes, silylated polyurethanes, silylated polyureas, silylated polyethers and silylated polysulphides, the adhesives and sealants of the invention are preferably one-component systems. However, it may also be advantageous to configure the system of the invention as two-component systems. In this case one component comprises the polymer component (A), while the second component comprises, for example, a catalyst or micronized water as a booster to accelerate the curing of the system. It is advantageous to ensure that the components employed in a one-component system do not adversely affect the shelflife of the composition, i.e. do not to a significant extent during storage initiate the reaction of the silane groups present in the composition that leads to crosslinking. More particularly this means that such further components preferably no water or at most traces of water. It may therefore be sensible to carry out physical or chemical drying of certain components before incorporating and mixing them into these compositions. If such drying is not possible or not desirable, it may be advantageous in these cases to configure the adhesive or sealant as a two-component system, with the component or components which adversely affect the shelflife being formulated separately from component (A) into the second component.

The compositions of the invention comprising silylated polyurethanes, silylated polyureas, silylated polyethers and silylated polysulphides are stored in the absence of moisture, and are storage-stable, which means that, in the absence of moisture, they can be kept in a suitable pack or facility, such as a drum, a pouch or a cartridge, for example, over a period of several months to a number of years, without suffering any change that is relevant to their practical service in their performance properties or in their properties after curing. The storage stability or shelflife is typically determined via measurement of the viscosity, the extrusion quantity or the extrusion force.

A property of the silane groups is that of undergoing hydrolysis on contact with moisture. This process is accompanied by formation of organosilanols (organosilicon compound comprising one or more silanol groups, SiOH groups) and, by subsequent condensation reactions, organosiloxanes (organosilicon compound comprising one or more siloxane groups, Si—O—Si groups). As the outcome of this reaction, which can be accelerated through the use of catalysts, the composition finally cures. This process is also referred to as crosslinking. The water required for the curing reaction may come from the air (atmospheric humidity), or else the composition may be contacted with a water-comprising component, by being brushed with a smoothing agent, for example, or by being sprayed, or else a water-comprising component may be added to the composition at application, in the form, for example, of a water-containing paste which is mixed in, for example, via a static mixer.

The compositions comprising silane groups cure on contact with moisture. Curing takes place at different rates depending on temperature, nature of contact, amount of moisture, and the presence of any catalysts. Curing by means of atmospheric moisture first forms a skin on the surface of the composition. The so-called skin formation time, accordingly, constitutes a measure of the cure rate. Typically it is desirable to aim for a skinning time of up to 2 hours at 23° C. and 50% relative atmospheric humidity. In the cured state, the compositions comprising silylated polyurethanes, silylated polyureas, silylated polyethers and silylated polysulphides possess a high mechanical strength in conjunction with high expandability, and also have good adhesion properties. This makes them suitable for a multiplicity of applications, more particularly as an elastic adhesive, as an elastic sealant or as an elastic coating. They are especially suitable for applications which require rapid curing and which impose exacting requirements on expandability at the same time as exacting requirements on the adhesion properties and the strengths.

The present invention further provides for the use of the adhesive or sealant as a one- or two-component system for producing material bonds between parts to be joined. In the cured state the composition of the invention possesses a high mechanical strength in conjunction with high expandability, and also good adhesion properties. Consequently it is suitable for a multiplicity of applications, more particularly as an elastic adhesive, as an elastic sealant or as an elastic coating.

In particular it is suitable for applications which require rapid curing and impose exacting requirements on expandability at the same time as exacting requirements on the adhesion properties and the strengths.

Suitable applications are, for example, the material bonds between parts to be joined made of concrete, mortar, glass, metal, ceramic, plastic and/or wood. In one particular embodiment the parts to be joined are firstly a surface and secondly a covering in the form of carpet, PVC, laminate, rubber, cork, linoleum, wood, e.g. woodblock flooring, floorboards, boat decks or tiles. The composition of the invention can be used in particular for the jointing of natural stone. Moreover, the adhesives and sealants of the invention can be used for the manufacture or repair of industrial goods or consumer goods, and also for the sealing or bonding of components in construction or civil engineering, and also, in particular, in the sanitary sector. The parts to be joined may especially be parts in automotive, trailer, lorry, caravan, train, aircraft, watercraft and railway construction.

An adhesive for elastic bonds in this sector is applied with preference in the form of a bead in a substantially round or triangular cross-sectional area. Elastic bonds in vehicle construction are, for example, the adhesive attachment of parts such as plastic covers, trim strips, flanges, bumpers, driver's cabs or other components for installation, to the painted body of a means of transport, or the bonding of glazing into the body.

A preferred area of application in construction and civil engineering is that of construction joints, flooring joints, joints in accordance with the German Water Management Law, flashing joints, expansion joints or sealed joints in the sanitary sector. In one preferred embodiment the composition described is used as an elastic adhesive or sealant. In the form of an elastic adhesive, the composition typically has an elongation at break of at least 5%, and in the form of an elastic sealant it typically has an elongation at break of at least 300%, at room temperature.

For use of the composition as a sealant for joints, for example, in construction or civil engineering, or for use as an adhesive for elastic bonds in automotive construction, for example, the composition preferably has a paste-like consistency with properties of structural viscosity. A paste-like sealant or adhesive of this kind is applied by means of a suitable device to the part to be joined. Suitable methods of application are, for example, application from standard commercial cartridges, pouches or pouches inserted in cartridges, which are operated manually or by means of compressed air, or from a drum or hobbock by means of a conveying pump or an eccentric screw pump, optionally by means of an application robot.

The parts to be joined may where necessary be pretreated before the adhesive or sealant is applied. Such pretreatments include, in particular, physical and/or chemical cleaning processes, examples being abrading, sandblasting, brushing or the like, or treatment with cleaners or solvents, or the application of an adhesion promoter, an adhesion promoter solution or a primer.

In the context of its use as an adhesive, the composition of the invention is applied either to one or the other part to be joined, or to both parts to be joined. Thereafter the parts to be bonded are joined, and the adhesive cures. It must in each case be ensured that the joining of the parts takes place within what is referred to as the open time, in order to ensure that the two parts to be joined are reliably bonded to one another.

The present invention further provides a process for preparing an adhesive or sealant, where a) component (A), component (B) and, optionally, at least one compound from the group consisting of filler, plasticizer, thixotropic agent, antioxidant and UV absorber, are introduced, (b) optionally at least one compound from the group consisting of solvent and adhesion promoter is added and the components are mixed homogeneously.

For the preparation process of the invention it is considered preferred that the components employed are mixed with one another and/or kept moving throughout the entire operation. Alternatively the components employed may also be mixed with one another only at the end of the preparation process. Suitable mixing equipment encompasses all of the apparatus known for this purpose to the skilled person, and more particularly may be a static mixer, planetary mixer, horizontal turbulent mixer (from Drais), planetary dissolver or Dissolver (from PC Laborsysteme), intensive mixer and/or extruder.

The process of the invention for preparing the adhesive or sealant may be carried out discontinuously in, for example, a planetary mixer. It is, however, also possible to operate the process continuously, in which case extruders in particular have been found suitable for this purpose. In that case the binder is fed to the extruder, and liquid and solid adjuvants are metered in.

It has been found, surprisingly, that the adhesives and sealants of the invention, in comparison to the prior art, exhibit good mechanical properties as well as a relatively low yield point and result in optimal smoothness. Through the provision of the adhesives and sealants of the invention, therefore, it has been possible to solve the stated problem in its entirety.

The examples which follow illustrate the advantages of the present invention.

EXAMPLES

Preparation Example 1

Preparation of 2-ethylhexyl methyl terephthalate

A 2000 ml multi-neck flask stirring apparatus, composed of an intensive condenser, which is attached to a thermostat, and a distillation bridge, is charged with 1 mol of dimethyl terephtalate in 1.2 l of xylene at 40° C., and a mixture of 340 mg of titanium(IV) butoxide and 1 mol of 2-ethyl-1-hexanol is added dropwise.

The mixture is then heated to 130° C. and is boiled under reflux for 8 h (condition intensive condenser at 80° C.). The methanol which forms is distilled off during the reaction.

After the reaction, the mixture is cooled to 20° C. over the course of 8 h, and the sediment that forms is filtered through glass wool. The filter cake, consisting of dimethyl terephthalate, is discarded and the filtrate is stored at −10° C. for 5 h. It is then filtered again through glass wool, and dimethyl terephthalate that forms is separated off. For the removal of the xylene solvent, the filtrate is distilled under a reduced pressure of 25 mbar at 40° C. The resultant 2-ethylhexyl methyl terephthalate has a purity by GC MS of 54.3% by weight. The remainder, of 45.7% by weight, is di-2-ethylhexyl terephthalate.

Application Example 1

The binder Acronal S 410 is adjusted to a pH of 8. Then the pigment dispersant Pigmentverteiler NL is introduced, Lutensol AO 89 is added, and the components are mixed with one another. Subsequently, the respective plasticizer, Kronos 2056, and Omyacarb 2 SV are added and mixed. The sealant is dispensed into aluminium or plastic cartridges.

Application Example 2

Plasticizer, Socal U1S2, and Omyalite 90 T are introduced and mixed with one another at a temperature of 60° C. under reduced pressure. Then binder and Aerosil R 202 are added. In the last step, Dynasylan GLYMO and Metatin 740 are added and mixed. The sealant is dispensed into aluminium or plastic cartridges.

Use Example 3

⅓ of the binder PP 600, the respective plasticizer, and Omyacarb 2SV are introduced and mixed with one another under reduced pressure. Then ⅔ of PP 600 and Aerosil R 202 are added. In the last step, Dynasylan GLYMO and Lupranat N 106 DMDEE are added and mixed. The sealant is dispensed into aluminium or plastic cartridges. The respective formulations are reproduced in the tables, with the numerical figures in the columns referring to parts by weight.

The plasticizer mixture is composed of

|  | % by weight |
|---|---|
| Di-2-ethylhexyl terephthalate | 45.7 |
| 2-Ethylhexyl methyl terephthalate | 54.3 |

Application Example 1

|  | Acrylate 1 (comparative) | Acrylate 2 (inventive) | Acrylate 3 (inventive) |
|---|---|---|---|
| DOTP | 20.00 | 18.16 | 1.59 |
| Plasticizer mixture | — | 2.03 | 20.37 |
| Acronal S 410 pH 8 | 32.00 | 32.00 | 32.00 |
| Kronos 2056 | 1.50 | 1.50 | 1.50 |
| Omyacarb 2 SV | 45.60 | 45.41 | 43.64 |
| Pigmentverteiler NL | 0.60 | 0.60 | 0.60 |
| Lutensol AO 89 | 0.30 | 0.30 | 0.30 |
| Tensile strength [Mpa] | 0.39 | 0.31 | 0.35 |
| Elongation at break [%] | 125.00 | 105.00 | 115.00 |
| Flow point [Pa] | 7753 | 6113 | 5024 |
| Skin formation time [min] | 26 | 20 | 24 |
| Smoothability | 3-4 | 3 | 1 |

Application Example 2

|  | STP 1 (comparative) | STP 2 (inventive) | STP 3 (inventive) |
|---|---|---|---|
| DOTP | 20.00 | 18.16 | 1.59 |
| Plasticizer mixture | — | 2.03 | 20.37 |
| Polymer ST 61 | 30.00 | 30.00 | 30.00 |
| Aerosil R 202 | 3.00 | 3.00 | 3.00 |
| Omyalite 90 T | 45.50 | 45.31 | 43.54 |
| Dynasylan GLYMO | 1.00 | 1.00 | 1.00 |
| Metatin 740 | 0.50 | 0.50 | 0.50 |
| Tensile strength [Mpa] | 3.38 | 3.48 | 3.28 |
| Elongation at break [%] | 228.00 | 264.00 | 244.00 |
| Flow point [Pa] | 4502 | 3783 | 2984 |
| Skin formation time [min] | 31 | 32 | 31 |
| Smoothability | 4 | 3 | 1 |

Application Example 3

|  | PU 1 (comparative) | PU 2 (inventive) | PU 3 (inventive) |
|---|---|---|---|
| DOTP | 20.00 | 18.16 | 1.59 |
| Plasticizer mixture | — | 2.03 | 20.37 |
| PP 600 | 30.00 | 30.00 | 30.00 |
| Aerosil R 202 | 3.00 | 3.00 | 3.00 |
| Omyacarb 2 SV | 46.45 | 46.26 | 44.49 |
| Dynasylan GLYMO | 0.50 | 0.50 | 0.50 |
| Lupranat N 106 DMDEE | 0.05 | 0.05 | 0.05 |
| Tensile strength [Mpa] | 2.25 | 2.26 | 2.05 |
| Elongation at break [%] | 809 | 775 | 787 |
| Flow point [Pa] | 917 | 709 | 667 |
| Skin formation time [min] | 63 | 62 | 59 |
| Smoothability | 4 | 3 | 2 |

As is evident from the examples, the addition of 2-ethylhexyl methyl terephthalate allows a reduction in the flow point, relative to the use of conventional terephthalates, in adhesives and sealants, and allows the smoothability to be improved.

Key:
PP 600: polyurethane binder from BASF SE
Polymer ST 61: silane-terminated polyurethane binder from Hanse Chemie AG
DOTP: Dioctyl terephthalate (bis(2-ethylhexyl) terephthalate)
Omyacarb 2 SV: ground chalk from Omya Inc.
Omyalite 90 T: high-purity, surface-treated calcium carbonate from Omya Inc.
Aerosil R 202: fumed silica from Evonik Degussa GmbH
Dynasylan GLYMO: 3-glycidyloxypropyltrimethoxysilane from Evonik Degussa GmbH
Lupranat N 106 DMDEE: 2,2'-dimorpholinyldiethyl ether from BASF SE
Metatin 740: dibutyltin ketonate from Acima AG
Acronal S 410: acrylate dispersion from BASF SE
Pigmentverteiler NL: pigment dispersant, polyacrylic acid sodium salt in water, from BASF SE
Lutensol AO 89: fatty alcohol ethoxylate, in water, from BASF SE
Kronos 2056: titanium dioxide from KRONOS INTERNATIONAL, Inc.
Socal U1S2: precipitated chalk ultrafine coated from Solvay S.A.

Methods:
The tensile test was carried out in a method based on DIN 53504.

The flow point was determined in oscillation mode at 23° C. using a Physica MCR 301 rheometer from Anton Paar GmbH under the following conditions:
Deformation: 0.01-100%
Circular frequency: 10 1/s The skin formation time was determined by placing a metal rod on the surface of the material. The time is reached when material no longer adheres to the tip of the metal rod.

The smoothability is determined by the smoothing of a bead of adhesive or sealant. For this purpose, the material is sprayed with a smoothing agent and then a finger is used for spreading over the bead 10 times until a planar layer is formed. The optical result and the spreading behaviour are summarized as smoothability and are evaluated using a school grade system from 1 to 6, where 1 is very good and 6 is inadequate.

The invention claimed is:
1. An adhesive or sealant comprising:
   (A) 10 to 90% by weight of at least one compound selected from the group consisting of polyurethanes, polyureas, polyacrylates, polysulphides, silylated polyurethanes, silylated polyureas, silylated polyethers, silylated polysulphides and silyl-terminated acrylates,
   (B) 0.80 to 30% by weight of 2-ethylhexyl methyl terephthalate, based on the overall adhesive or sealant,
   0 to 40% of plasticizer,
   0 to 80% of fillers, and
   0 to 10% of rheology modifiers.

2. The adhesive or sealant according to claim 1, further comprising at least one plasticizer.

3. The adhesive or sealant according to claim 2, wherein the plasticizer comprises di-2-ethylhexyl terephthalate.

4. The adhesive or sealant according to claim 1, further comprising at least one component selected from the group consisting of an auxiliary, an additive, a dispersant, a film-forming assistant, a pigment, a rheological assistant, a water scavenger, an adhesion promoter, a catalyst, a light stabilizer, an ageing inhibitor, a flame retardant, and a biocide.

5. The adhesive or sealant according to claim 1, characterized in that it is a one-component system.

6. The adhesive or sealant according to claim 1, characterized in that it is a two-component system.

7. A process for preparing an adhesive or sealant according to claim 1, comprising:
   a) combining component (A), component (B) and optionally at least one compound selected from the group consisting of a filler, a plasticizer, a thixotropic agent, an antioxidant and a UV absorber,
   b) optionally adding at least one compound selected from the group consisting of solvent and adhesion promoter is added, and mixing the components homogeneously.

8. The process for preparing an adhesive or sealant according to claim 7, wherein the process is carried out discontinuously.

9. The process for preparing an adhesive or sealant according to claim 7, wherein the process is carried out continuously.

10. A method for producing material bonds between parts to be joined comprising:
    preparing the adhesive or sealant according to claim 1; and
    applying the adhesive or sealant between the parts to be joined.

11. The method of claim 10, wherein the parts to be joined are made of stone, concrete, mortar, glass, metal, ceramic, plastic and/or wood.

12. The method of claim 10, wherein one of the parts to be joined is a surface and another part to be joined is a carpet covering, a PVC covering, a laminate, a rubber covering, a cork covering, a linoleum covering, a wood covering or tiles.

13. The method of claim 10, wherein the material bond is a construction joint, an expansion joint, a flooring joint, a facade joint, building partition joints, flashing joints, glazing, window glazing, structural glazing, roof glazing, window sealing or a sealed joint in the sanitary sector.

14. The method of claim 10, wherein the parts to be joined are parts in electrical, mechanical, automotive, lorry, caravan, train, trailer, aircraft, watercraft and railway construction.

15. The adhesive or sealant according to claim 1, wherein the adhesive or sealant comprises at least the following components:
    10 to 90% of component (A)
    1 to 20% of component (B)
    0 to 40% of plasticizer
    0 to 80% of fillers
    0 to 10% of rheology modifiers.

* * * * *